US009056970B2

(12) United States Patent
Davis et al.

(10) Patent No.: US 9,056,970 B2

(45) Date of Patent: Jun. 16, 2015

(54) HIGH-DENSITY POLYETHYLENE COMPOSITIONS, METHOD OF PRODUCING THE SAME, CLOSURE DEVICES MADE THEREFROM, AND METHOD OF MAKING SUCH CLOSURE DEVICES

(75) Inventors: Mark B. Davis, Lake Jackson, TX (US); Dale M. Elley-Bristow, Sarnia (CA); William J. Michie, Jr., Missouri City, TX (US); Stephanie M. Whited, Charleston, WV (US); Theresa J. Hermel-Davidock, Randolph, NJ (US)

(73) Assignee: Dow Global Technologies LLC, Midland, MI (US)

(*) Notice: Subject to any disclaimer, the term of this patent is extended or adjusted under 35 U.S.C. 154(b) by 14 days.

(21) Appl. No.: 13/144,465

(22) PCT Filed: Jan. 27, 2010

(86) PCT No.: PCT/US2010/022220

§ 371 (c)(1),
(2), (4) Date: Jul. 13, 2011

(87) PCT Pub. No.: WO2010/088265

PCT Pub. Date: Aug. 5, 2010

(65) Prior Publication Data

US 2012/0022214 A1 Jan. 26, 2012

Related U.S. Application Data

(60) Provisional application No. 61/148,443, filed on Jan. 30, 2009.

(51) Int. Cl.

| | |
|---|---|
| ***C08L 23/08*** | (2006.01) |
| ***C08F 297/08*** | (2006.01) |
| ***C08L 23/04*** | (2006.01) |
| ***C08F 2/00*** | (2006.01) |
| ***C08L 23/06*** | (2006.01) |

(52) U.S. Cl.

CPC ............... *C08L 23/04* (2013.01); *C08F 297/08* (2013.01); *C08F 2/001* (2013.01); *C08F 297/083* (2013.01); *C08L 23/08* (2013.01); *C08L 23/0815* (2013.01); *C08L 2205/025* (2013.01); *C08L 2205/06* (2013.01); *C08L 23/06* (2013.01); *C08L 2205/02* (2013.01)

(58) Field of Classification Search

CPC ..... C08L 23/08; C08L 23/0815; C08L 23/04; C08L 23/06; C08L 2205/02; C08L 2205/025; C08L 2205/06; C08F 2/001; C08F 297/08; C08F 297/083

USPC .............................. 525/53, 191, 240; 526/65

See application file for complete search history.

(56) References Cited

U.S. PATENT DOCUMENTS

| | | | |
|---|---|---|---|
| 4,302,565 | A | 11/1981 | Goeke et al. |
| 4,508,842 | A | 4/1985 | Beran et al. |
| 4,530,914 | A | 7/1985 | Ewen et al. |
| 4,871,705 | A | 10/1989 | Hoel |
| 4,937,299 | A | 6/1990 | Ewen et al. |
| 5,017,714 | A | 5/1991 | Welborn, Jr. |
| 5,026,798 | A | 6/1991 | Canich |
| 5,055,438 | A | 10/1991 | Canich |
| 5,082,902 | A | 1/1992 | Gurevitch et al. |
| 5,096,867 | A | 3/1992 | Canich |
| 5,106,926 | A | 4/1992 | Eisinger et al. |
| 5,120,867 | A | 6/1992 | Welborn, Jr. |
| 5,124,418 | A | 6/1992 | Welborn, Jr. |
| 5,198,401 | A | 3/1993 | Turner et al. |
| 5,210,352 | A | 5/1993 | Alt et al. |
| 5,229,478 | A | 7/1993 | Floyd et al. |
| 5,243,001 | A | 9/1993 | Winter et al. |

(Continued)

FOREIGN PATENT DOCUMENTS

| | | |
|---|---|---|
| EP | 0 420 436 | 4/1991 |
| EP | 0 520 732 | 12/1992 |

(Continued)

OTHER PUBLICATIONS

Zimm, B.H., J. Chem. Phys., 16, 1099-1116, No. 12, Dec. 1948, "Apparatus and Methods for Measurement and Interpretation of the Angular Variation of Light Scattering; Preliminary Results on Polystyrene Solutions".

(Continued)

*Primary Examiner* — Roberto Rabago

(57) ABSTRACT

The instant invention is a high-density polyethylene composition, method of producing the same, closure devices made therefrom, and method of making such closure devices. The high-density polyethylene composition according to the present invention comprises (a) a first component comprising a high molecular weight ethylene alpha-olefin copolymer having a density in the range of 0.927 to 0.938 g/cm3, and a melt flow rate (I21) in the range of 4 to 10 g/10 minutes, and (b) a second component comprising a low molecular weight ethylene polymer having a density in the range of 0.960 to 0.975 g/cm3, and a melt index (I2) in the range of 100 to 1200 g/10 minutes; and wherein the high-density polyethylene composition has a melt index (I2) in the range of from 2 to 10 g/10 minutes, a density in the range of from 0.950 to 0.960 g/cm3, and a flow direction shrinkage to cross flow direction shrinkage ratio in the range of from 2 to 3.2, and an environmental stress crack resistance (ESCR) (F50) according to ASTM D-1693, condition B at 50° C., and using 10 percent Branched Octylphenoxy Poly(Ethyleneoxy) Ethanol, in the range of equal to or greater than 50 hours.

7 Claims, No Drawings

(56) References Cited

U.S. PATENT DOCUMENTS

| | | | |
|---|---|---|---|
| 5,264,405 | A | 11/1993 | Canich |
| 5,272,236 | A | 12/1993 | Lai et al. |
| 5,278,119 | A | 1/1994 | Turner et al. |
| 5,278,264 | A | 1/1994 | Spaleck et al. |
| 5,278,272 | A | 1/1994 | Lai et al. |
| 5,290,745 | A | 3/1994 | Jorgensen et al. |
| 5,292,845 | A | 3/1994 | Kawasaki et al. |
| 5,304,614 | A | 4/1994 | Winter et al. |
| 5,317,036 | A | 5/1994 | Brady, III et al. |
| 5,324,800 | A | 6/1994 | Welborn, Jr. et al. |
| 5,332,793 | A | 7/1994 | Cann |
| 5,342,907 | A | 8/1994 | Cann et al. |
| 5,347,025 | A | 9/1994 | Yamada et al. |
| 5,350,723 | A | 9/1994 | Neithamer et al. |
| 5,384,299 | A | 1/1995 | Turner et al. |
| 5,391,789 | A | 2/1995 | Rohrmann |
| 5,391,790 | A | 2/1995 | Rohrmann et al. |
| 5,399,636 | A | 3/1995 | Alt et al. |
| 5,408,017 | A | 4/1995 | Turner et al. |
| 5,410,003 | A | 4/1995 | Bai |
| 5,455,366 | A | 10/1995 | Rohrmann et al. |
| 5,472,495 | A | 12/1995 | Schroeder |
| 5,491,207 | A | 2/1996 | Hoel |
| 5,527,752 | A | 6/1996 | Reichle et al. |
| 5,534,473 | A | 7/1996 | Welch et al. |
| 5,539,124 | A | 7/1996 | Etherton et al. |
| 5,554,775 | A | 9/1996 | Krishnamurti et al. |
| 5,621,126 | A | 4/1997 | Canich et al. |
| 5,684,098 | A | 11/1997 | Wang et al. |
| 5,693,730 | A | 12/1997 | Kuber et al. |
| 5,698,634 | A | 12/1997 | Yasuda et al. |
| 5,710,297 | A | 1/1998 | Weller et al. |
| 5,712,354 | A | 1/1998 | Boncella et al. |
| 5,714,427 | A | 2/1998 | Winter et al. |
| 5,714,555 | A | 2/1998 | Chabrand et al. |
| 5,728,641 | A | 3/1998 | Aida et al. |
| 5,728,839 | A | 3/1998 | Herrmann et al. |
| 5,753,577 | A | 5/1998 | Hamura et al. |
| 5,767,209 | A | 6/1998 | McNally et al. |
| 5,770,664 | A | 6/1998 | Okumura et al. |
| 5,770,753 | A | 6/1998 | Kuber et al. |
| 6,152,543 | A | 11/2000 | Schlund et al. |
| 6,184,320 | B1 | 2/2001 | Starzewski et al. |
| 6,187,866 | B1 | 2/2001 | Jorgensen et al. |
| 6,248,831 | B1 | 6/2001 | Maheshwari et al. |
| RE37,384 | E | 9/2001 | Winter et al. |
| 6,485,662 | B1 | 11/2002 | Neubauer et al. |
| 6,511,935 | B2 | 1/2003 | Job |
| 2006/0287445 | A1 | 12/2006 | Whited et al. |

FOREIGN PATENT DOCUMENTS

| | | | |
|---|---|---|---|
| EP | 0 591 756 | | 4/1994 |
| EP | 0 743 324 | | 11/1996 |
| EP | 1 357 136 | A1 | 10/2003 |
| EP | 1 655 335 | | 5/2006 |
| EP | 1 655 336 | | 5/2006 |
| EP | 1 655 337 | | 5/2006 |
| EP | 1655338 | A1 | 5/2006 |
| EP | 2017302 | A1 | 1/2009 |
| WO | 91/04257 | | 4/1991 |
| WO | 92/00333 | | 1/1992 |
| WO | 93/08199 | | 4/1993 |
| WO | 93/08221 | | 4/1993 |
| WO | 94/01471 | | 1/1994 |
| WO | 96/20233 | | 7/1996 |
| WO | 97/15582 | | 5/1997 |
| WO | 97/19959 | | 6/1997 |
| WO | 97/46567 | | 12/1997 |
| WO | 98/06759 | | 2/1998 |
| WO | 98/11144 | | 3/1998 |
| WO | 01/05845 | A1 | 1/2001 |
| WO | 03091294 | A1 | 11/2003 |
| WO | 2008136849 | A1 | 11/2008 |
| WO | WO 2008/136849 | A1 * | 11/2008 |

OTHER PUBLICATIONS

Randall, J.C., Rev. Macromol. Chem. Phys., C29, 285-297, 1989, "A Review of High Resolution Liquid 13Carbon Nuclear Magnetic Resonance Characterizations of Ethylene-Based Polymers", Chapter, IX. Long-Chain Branching in Polyethylene, Baytown Polymers Center, Exxon Chemical Company, Baytown, Texas 77522, Marcel Dekker, Inc.

Williams and Ward, J. Polym. Sci., Part B: Polymer Letters, "The construction of a polyethylene calibration curve for gel permeation chromatography using polystyrene fractions", Sep. 1968, vol. 6, issue 9, pp. 621-624.

PCT/US10/022220, International Preliminary Report on Patentability , Aug. 2, 2011.

PCT/US10/022220, Search Report and Written Opinion , Apr. 1, 2010.

European Communication pursuant to Article 94(3) for counterpart European Application No. 10702954.8. Jan. 2015.

EP Response to Office Action dated Feb. 13, 2015; from counterpart European Application No. 10702954.8.

* cited by examiner

HIGH-DENSITY POLYETHYLENE COMPOSITIONS, METHOD OF PRODUCING THE SAME, CLOSURE DEVICES MADE THEREFROM, AND METHOD OF MAKING SUCH CLOSURE DEVICES

CROSS-REFERENCE TO RELATED APPLICATIONS

This application is a non-provisional application claiming priority from the U.S. Provisional Patent Application No. 61/148,443, filed on Jan. 30, 2009, entitled "HIGH DENSITY POLYETHYLENE COMPOSITIONS, METHOD OF PRODUCING THE SAME, CLOSURE DEVICES MADE THEREFROM, AND METHOD OF MAKING SUCH CLOSURE DEVICES," the teachings of which are incorporated by reference herein, as if reproduced in full hereinbelow.

FIELD OF INVENTION

The instant invention relates to a high-density polyethylene composition, method of producing the same, closure devices made therefrom, and method of making such closure devices.

BACKGROUND OF THE INVENTION

The use of polymeric materials to manufacture molded articles, such as closure devices and containers, is generally known. Different methods may be employed to manufacture closure devices, such as bottle caps, or containers, such as bottles. For example, such closure devices may be manufactured via compression molding or injection molding processes while such containers may be manufactured via blow molding, injection blow molding, or injection stretch blow molding.

In compression molding process, a two-piece mold provides a cavity having the shape of a desired molded article. The mold is heated, and an appropriate amount of molten molding compound from an extruder is loaded into the lower half of the mold. The two parts of the mold are brought together under pressure. The molding compound, softened by heat, is thereby welded into a continuous mass having the shape of the cavity. If the molding compound is a thermosetting material, the continuous mass may be hardened via further heating, under pressure, in the mold. If the molding compound is a thermoplastic material, the continuous mass may be hardened via chilling, under pressure, in the mold.

In injection molding process, molding compound is fed into an extruder via a hopper. The extruder conveys, heats, melts, and pressurizes the molding compound to a form a molten stream. The molten stream is forced out of the extruder through a nozzle into a relatively cool mold held closed under pressure thereby filling the mold. The melt cools and hardens until fully set-up. The mold then opens and the molded part is removed.

In blow molding process, for example, injection blow molding, the molding compound is melted, and then, it is formed into a tube or parison. The ends of the tube or parison is sealed, except for an area in which the blowing air can enter. The sealed tube or parison is inflated inside of a mold thereby taking the shape of the mold. The molded article is cooled, and then ejected from the mold. If necessary, the molded article is then trimmed.

In general, a closure device, such as a soda bottle cap, should be strong enough to withstand the pressure of a carbonated drink, and yet soft enough to provide an excellent seal on the bottle without the need for an inner liner. Additionally, a closure device, such as a soda bottle cap, should generally possess good environmental stress crack resistance, good impact strength, good removal torque, and good strip torque. Different techniques have been employed to provide for such closure devices having acceptable properties.

Polypropylene based closure devices including a soft inner liner, which may be comprised of ethylene/vinyl acetate (EVA), polyvinyl chloride (PVC), or butyl rubber, are generally known. However, this two-part construction is costly because of the need for an inner liner. Furthermore, it would be easier and more convenient to use a one-piece closure device, without a liner.

In attempts to eliminate the need for a two-part construction, the use of different blends of polymers has been suggested. However, there is still a need for suitable moldable polymeric materials eliminating the need for liners to facilitate a seal and further having improved properties such as improved shrinkage properties while maintaining satisfactory environmental stress crack resistance. Such polymeric materials may be formed into molded articles utilizing existing equipments without the need for major equipment modifications.

SUMMARY OF THE INVENTION

The instant invention is a high-density polyethylene composition, method of producing the same, closure devices made therefrom, and method of making such closure devices.

The high-density polyethylene composition according to the present invention comprises (a) a first component comprising a high molecular weight ethylene alpha-olefin copolymer having a density in the range of 0.927 to 0.938 g/cm$^3$, and a melt flow rate ($I_{21}$) in the range of 4 to 10 g/10 minutes, and (b) a second component comprising a low molecular weight ethylene polymer having a density in the range of 0.960 to 0.975 g/cm$^3$, and a melt index ($I_2$) in the range of 100 to 1200 g/10 minutes; and wherein the high-density polyethylene composition has a melt index ($I_2$) in the range of from 2 to 10 g/10 minutes, a density in the range of from 0.950 to 0.960 g/cm$^3$, and a flow direction shrinkage to cross flow direction shrinkage ratio in the range of from 2 to 3.2, and an environmental stress crack resistance (ESCR) ($F_{50}$) according to ASTM D-1693, condition B at 50° C., and using 10 percent Octylphenoxy Poly(Ethyleneoxy) Ethanol, Branched (Igepal C)-630) in the range of equal to or greater than 50 hours.

The method of producing a high-density polyethylene composition according to the present invention comprises the steps of: (1) introducing ethylene, and optionally one or more alpha-olefin comonomers into a first reactor; (2) polymerizing the ethylene optionally in the presence of the one or more alpha-olefin comonomers in the first reactor thereby producing a first component comprising a high molecular weight ethylene alpha-olefin copolymer having a density in the range of 0.927 to 0.938 g/cm$^3$, and a melt flow rate ($I_{21}$) in the range of 4 to 10 g/10 minutes; (3) introducing the first component and additional ethylene into a second reactor; (4) polymerizing the additional ethylene in the second reactor in the presence of the first component thereby producing a second component comprising a low molecular weight ethylene polymer having a density in the range of 0.960 to 0.975 g/cm$^3$, and a melt index ($I_2$) in the range of 100 to 1200 g/10 minutes; and (5) thereby producing the high-density polyethylene composition having a melt index ($I_2$) in the range of from 2 to 10 g/10 minutes, a density in the range of 0.950 to 0.960 g/cm$^3$, a flow direction shrinkage to cross flow direction shrinkage ratio in the range of from 2 to 3.2, and an environmental stress crack resistance (ESCR) ($F_{50}$) according to ASTM D-1693, condition B at 50° C., and using 10 percent Branched Octylphenoxy Poly(Ethyleneoxy) Ethanol, in the range of equal to or greater than 50 hours.

A closure device according to the present invention comprises a high-density polyethylene composition comprising (a) a first component comprising a high molecular weight ethylene alpha-olefin copolymer having a density in the range of 0.927 to 0.938 g/cm$^3$, and a melt flow rate ($I_{21}$) in the range of 4 to 10 g/10 minutes, (b) a second component comprising a low molecular weight ethylene polymer having a density in the range of 0.960 to 0.975 g/cm$^3$, and a melt index ($I_2$) in the range of 100 to 1200 g/10 minutes; and wherein the high-density polyethylene composition has a melt index ($I_2$) in the range of from 2 to 10 g/10 minutes, a density in the range of from 0.950 to 0.960 g/cm$^3$, a flow direction shrinkage to cross flow direction shrinkage ratio in the range of from 2 to 3.2, and an environmental stress crack resistance (ESCR) ($F_{50}$) according to ASTM D-1693, condition B at 50° C., and using 10 percent Branched Octylphenoxy Poly(Ethyleneoxy) Ethanol, in the range of equal to or greater than 50 hours.

The method of making a closure device according to the present invention comprises the steps of: (1) providing a high-density polyethylene composition comprising: (a) a first component comprising a high molecular weight ethylene alpha-olefin copolymer having a density in the range of 0.927 to 0.938 g/cm$^3$, and a melt flow rate ($I_{21}$) in the range of 4 to 10 g/10 minutes, and (b) a second component comprising a low molecular weight ethylene polymer having a density in the range of 0.960 to 0.975 g/cm$^3$, and a melt index ($I_2$) in the range of 100 to 1200 g/10 minutes; wherein the high-density polyethylene composition has a melt index ($I_2$) in the range of from 2 to 10 g/10 minutes, a density in the range of from 0.950 to 0.960 g/cm$^3$, and a flow direction shrinkage to cross flow direction shrinkage ratio in the range of from 2 to 3.2, and an environmental stress crack resistance (ESCR) ($F_{50}$) according to ASTM D-1693, condition B at 50° C., and using 10 percent Branched Octylphenoxy Poly(Ethyleneoxy) Ethanol, in the range of equal to or greater than 50 hours; (2) compression molding, blow molding, or injection molding the high-density polyethylene composition thereby forming the closure device.

In one embodiment, the invention provides the high-density polyethylene composition according to any embodiment disclosed herein, except that said high-density polyethylene composition has a melt flow ratio (I21/I2) of less than 60.

In one embodiment, the invention provides the high-density polyethylene composition according to any embodiment disclosed herein, except that said first component has a molecular weight, Mw, in the range of from 140,000 to 200,000.

In one embodiment, the invention provides the high-density polyethylene composition according to any embodiment disclosed herein, except that said second component has a molecular weight, Mw, in the range of from 10,000 to 30,000.

DETAILED DESCRIPTION OF THE INVENTION

The high-density polyethylene composition of the instant invention comprises a first component, and a second component. The first component comprises a high molecular weight ethylene alpha-olefin copolymer having a density in the range of 0.927 to 0.938 g/cm$^3$, and a melt flow rate ($I_{21}$) of 4 to 10 g/10 minutes. The second component comprises a low molecular weight ethylene polymer having a density in the range of 0.960 to 0.975 g/cm$^3$, and a melt index ($I_2$) in the range of 100 to 1200 g/10 minutes. The high-density polyethylene composition has a melt index ($I_2$) in the range of from 2 to 10 g/10 minutes, a density in the range of 0.950 to 0.960 g/cm$^3$.

The term "polymer" is used herein to indicate a homopolymer, an interpolymer (or copolymer), or a terpolymer. The term "polymer," as used herein, includes interpolymers, such as, for example, those made by the copolymerization of ethylene with one or more $C_3$-$C_{20}$ alpha-olefin(s).

The term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The term (co)polymerization, as used herein, refers to polymerization of ethylene optionally in the presence of one or more alpha-olefin comonomers.

The first component comprises a polymer; for example, a polyolefin. The first component preferably comprises an ethylene polymer; for example, the first component comprises a high molecular weight ethylene alpha-olefin copolymer. The first component is substantially free of any long chain branching. Substantially free of any long chain branching, as used herein, refers to an ethylene polymer preferably substituted with less than about 0.1 long chain branches per 1000 total carbons, and more preferably, less than about 0.01 long chain branches per 1000 total carbons. The presence of long chain branches is typically determined according to the methods known in the art, such as gel permeation chromatography coupled with low angle laser light scattering detector (GPC-LALLS) and gel permeation chromatography coupled with a differential viscometer detector (GPC-DV). The first component has a density in the range of 0.927 to 0.938 g/cm$^3$. All individual values and subranges from 0.927 to 0.938 g/cm$^3$ included herein and disclosed herein; for example, the first component has a density in the range of 0.929 to 0.936 g/cm$^3$, or in the alternative, the first component has a density in the range of 0.930 to 0.935 g/cm$^3$. The first component has a melt flow rate ($I_{21}$) in the range of 4 to 10 g/10 minutes. All individual values and subranges from 4 to 10 g/10 minutes are included herein and disclosed herein; for example, the first component has a melt flow rate ($I_{21}$) in the range of 4 to 9 g/10 minutes, or in the alternative, the first component has a melt flow rate ($I_{21}$) in the range of 4 to 5 g/10 minutes. The first component has molecular weight in the range of 150,000 to 375,000. All individual values and subranges from 150,000 to 375,000 are included herein and disclosed herein; for example, the first component has a molecular weight in the range of 175,000 to 375,000; or in the alternative, the first component has a molecular weight in the range of 200,000 to 375,000. The first component comprises about less than 10 percent by weight of units derived from one or more alpha-olefin comonomers, based on the weight of the first component. All individual values and subranges less than 10 weight percent are included herein and disclosed herein. The first component may comprise at least about 90 percent by weight of units derived from ethylene, based on the weight of the first component. All individual values and subranges above 90 weight percent are included herein and disclosed herein; for example, the first component comprises at least 95 percent by weight of units derived from ethylene, based on the weight of the first component.

The alpha-olefin comonomers typically have no more than 20 carbon atoms. For example, the alpha-olefin comonomers may preferably have 3 to 10 carbon atoms, and more preferably 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. The alpha-olefin comonomers are preferably selected from the group consisting of propylene, 1-butene, 1-hexene, and 1-octene, and more preferably from the group consisting of 1-hexene and 1-octene.

The second component comprises a polymer; for example, a polyolefin. The second component may, for example, comprise an ethylene polymer. The second component may, for example, comprise a low molecular weight ethylene homopolymer. The ethylene homopolymer may contain trace amounts of contaminate comonomers, for example, alpha-olefin comonomers. The term ethylene homopolymer, as used herein, refers to an ethylene polymer containing at least 99 percent by weight of ethylene units. The second component is preferably substantially free of any long chain branching. Substantially free of any long chain branching, as used herein, refers to an ethylene polymer preferably substituted with less than about 0.1 long chain branches per 1000 total carbons, and more preferably, less than about 0.01 long chain branches per 1000 total carbons. The presence of long chain branches is typically determined according to the methods known in the art, as described above. The second component has a density in the range of 0.960 to 0.975 g/cm$^3$. All individual values and subranges from 0.960 to 0.975 g/cm$^3$ included herein and disclosed herein; for example, the second component has a density in the range of 0.960 to 0.973 g/cm$^3$. The second component has a melt index ($I_2$) in the range of 100 to 1200 g/10 minutes. All individual values and subranges from 100 to 1200 g/10 minutes are included herein and disclosed herein; for example, the second component may have a melt index ($I_2$) in the range of 100 to 1100 g/10 minutes; or in the alternative, the second component has a melt index ($I_2$) in the range of 200 to 1000 g/10 minutes. The second component has a molecular weight in the range of 12,000 to 40,000. All individual values and subranges from 12,000 to 40,000 are included herein and disclosed herein; for example, the second component has a molecular weight in the range of 15,000 to 40,000; or in the alternative, the second component has a molecular weight in the range of 20,000 to 40,000. The second component comprises less than 1.00 percent by weight of units derived from one or more alpha-olefin copolymers, based on the weight of the second component. All individual values and subranges from less than 1.00 weight percent are included herein and disclosed herein; for example, the second component may comprise 0.0001 to 1.00 percent by weight of units derived from one or more alpha-olefin copolymers; in the alternative, the second component may comprise 0.001 to 1.00 percent by weight of units derived from one or more alpha-olefin copolymers. The second component comprises at least about 99 percent by weight of ethylene, based on the weight of the second component. All individual values and subranges from 99 to 100 weight percent are included herein and disclosed herein; for example, the second component comprises 99.5 to 100 percent by weight of units derived from ethylene, based on the weight of the second component.

The high-density polyethylene composition has a density in the range of 0.950 to 0.960 g/cm$^3$. All individual values and subranges from 0.950 to 0.960 g/cm$^3$ are included herein and disclosed herein. The high-density polyethylene composition has a melt index ($I_2$) in the range of from 2 to 10 g/10 minutes. All individual values and subranges from 2 to 10 g/10 minutes are included herein and disclosed herein; for example, the high-density polyethylene composition has a melt index ($I_2$) in the range of from 2 to 8 g/10 minutes; or in the alternative, the high-density polyethylene composition has a melt index ($I_2$) in the range of from 2 to 5 g/10 minutes. The high-density polyethylene composition is substantially free of any long chain branching. Substantially free of any long chain branching, as used herein, refers to a polyethylene composition preferably substituted with less than about 0.1 long chain branches per 1000 total carbons, and more preferably, less than about 0.01 long chain branches per 1000 total carbons. The presence of long chain branches is typically determined according to the methods known in the art, as described above. The high-density polyethylene composition has a molecular weight distribution in the range of 6 to 25. All individual values and subranges from 6 to 25 are included herein and disclosed herein; for example, the high-density polyethylene composition has a molecular weight distribution in the range of 7 to 20; or in the alternative, the high-density polyethylene composition has a molecular weight distribution in the range of 7 to 17. The term molecular weight distribution or "MWD," as used herein, refers to the ratio of weight average molecular weight ($M_w$) to number average molecular weight ($M_n$), that is, ($M_w/M_n$), described in further details hereinbelow. The high-density polyethylene composition has an environmental stress crack resistance ($F_{50}$) of at least 50 hours measured according to ASTM D-1693, condition B at 50° C., and using 10 percent Branched Octylphenoxy Poly(Ethyleneoxy) Ethanol; or in the alternative, at least 200 hours measured according to ASTM D-1693, condition B at 50° C., and using 10 percent Branched Octylphenoxy Poly (Ethyleneoxy) Ethanol; or in the alternative, at least 250 hours measured according to ASTM D-1693, condition B at 50° C., and using 10 percent Branched Octylphenoxy Poly(Ethyleneoxy) Ethanol.

The high-density polyethylene composition may have a flow direction shrinkage to cross flow direction shrinkage ratio in the range of from 2.0 to 3.2. All individual values and subranges from 2 to 3.2 are included herein and disclosed herein. For example, the high-density polyethylene composition may have a flow direction shrinkage to cross flow direction shrinkage ratio in the range of from 2.0 to 3.1; or in the alternative, the high-density polyethylene composition may have a flow direction shrinkage to cross flow direction shrinkage ratio in the range of from 2.0 to 3.0; or in the alternative, the high-density polyethylene composition may have a flow direction shrinkage to cross flow direction shrinkage ratio in the range of from 2.1 to 3.2; or in the alternative, the high-density polyethylene composition may have a flow direction shrinkage to cross flow direction shrinkage ratio in the range of from 2.2 to 3.2.

The high-density polyethylene composition may comprise any amounts of first component, second component, or combinations thereof. The high-density polyethylene composition comprises 40 to 60 percent by weight of the first component, based on the total weight of the first and second components. All individual values and subranges from 40 to 60 weight percent are included herein and disclosed herein; for example, the high-density polyethylene composition comprises 45 to 55 percent by weight of the first component, based on the total weight of first and second components. The high-density polyethylene composition further comprises 40 to 60 percent by weight of the second component, based on the total weight of the first and second components. All individual values and subranges from 40 to 60 weight percent are included herein and disclosed herein; for example, the high-density polyethylene composition further comprises 45 to 55 percent by weight of the second component, based on the total weight of the first and second components.

The high-density polyethylene composition may further include additional components such as other polymers, and/or additives. Such additives include, but are not limited to, antistatic agents, color enhancers, dyes, lubricants, fillers, pigments, primary antioxidants, secondary antioxidants, processing aids, UV stabilizers, nucleators, and combinations thereof. The high-density polyethylene composition compromises about less than 10 percent by the combined weight of one or more additives, based on the weight of the high-density polyethylene composition. All individual values and subranges from about less than 10 weight percent are included herein and disclosed herein; for example, the high-density polyethylene composition comprises about less than 5 percent by the combined weight of one or more additives, based on the weight of the high-density polyethylene composition; or in the alternative, the high-density polyethylene composition comprises about less than 1 percent by the combined weight of one or more additives, based on the weight of the high-density polyethylene composition; or in another alternative, the high-density polyethylene composition may compromise about less than 0.5 percent by the combined weight of one or more additives, based on the weight of the high-density polyethylene composition. Antioxidants, such as IRGAFOS 168 and IRGANOX 1010, are commonly used to protect the polymer from thermal and/or oxidative degradation. IRGANOX 1010 is tetrakis(methylene(3,5-di-tert-butyl-4-hydroxyhydrocinnamate), which is commercially available from Ciba Geigy Inc. IRGAFOS 168 is tris (2,4 di-tert-butylphenyl)phosphite, which is commercially available from Ciba Geigy Inc.

The inventive high-density polyethylene composition may further be blended with other polymers. Such other polymers are generally known to a person of ordinary skill in the art. Blends comprising the inventive high-density polyethylene composition is formed via any conventional methods. For example, the selected polymers are melt blended via a single or twin screw extruder, or a mixer, for example, a Kobe LCM or KCM mixer, a Banbury mixer, a Haake mixer, a Brabender internal mixer.

In general, blends containing the inventive high-density polyethylene composition comprises at least 40 percent by weight of the inventive high-density polyethylene composition, based on the total weight of the blend. All individual values and subranges in the range of at least 40 weight percent are included herein and disclosed herein; for example, the blend comprises at least 50 percent by weight of the inventive high-density polyethylene composition, based on the total weight of the blend; or in the alternative, the blend comprises at least 60 percent by weight of the inventive high-density polyethylene composition, based on the total weight of the blend; or in the alternative, the blend comprises at least 70 percent by weight of the inventive high-density polyethylene composition, based on the total weight of the blend; or in the alternative, the blend comprises at least 80 percent by weight of the inventive high-density polyethylene composition, based on the total weight of the blend; or in the alternative, the blend comprises at least 90 percent by weight of the inventive high-density polyethylene composition, based on the total weight of the blend; or in the alternative, the blend comprises at least 95 percent by weight of the inventive high-density polyethylene composition, based on the total weight of the blend; or in the alternative, the blend comprises at least 99 percent by weight of the inventive high-density polyethylene composition, based on the total weight of the blend.

Different polymerization reactions and catalyst systems may be employed to produce the inventive high-density polyethylene composition. Typical transition metal catalyst systems used to prepare the high-density polyethylene composition are magnesium/titanium based catalyst systems, exemplified by the catalyst system described in U.S. Pat. No. 4,302,565; vanadium based catalyst systems, such as those described in U.S. Pat. No. 4,508,842; U.S. Pat. No. 5,332,793; U.S. Pat. No. 5,342,907; and U.S. Pat. No. 5,410,003; and a metallocene catalyst system, such as those described in U.S. Pat. No. 4,937,299; U.S. Pat. No. 5,317,036; and U.S. Pat. No. 5,527,752. Catalyst systems that use molybdenum oxides on silica-alumina supports are also useful. Preferred catalyst systems for preparing the components of the inventive high-density polyethylene composition are Ziegler-Natta catalyst systems and metallocene catalyst systems.

In some embodiments, preferred catalysts used in the process to make the high-density polyethylene compositions are of the magnesium/titanium type. In particular, for the gas phase polymerizations, the catalyst is made from a precursor comprising magnesium and titanium chlorides in an electron donor solvent. This solution is often either deposited on a porous catalyst support, or a filler is added, which, on subsequent spray drying, provides additional mechanical strength to the particles. The solid particles from either support methods are often slurried in a diluent producing a high viscosity mixture, which is then used as catalyst precursor. Exemplary catalyst types are described in U.S. Pat. No. 6,187,866 and U.S. Pat. No. 5,290,745, the entire contents of both of which are herein incorporated by reference. Precipitated/crystallized catalyst systems, such as those described in U.S. Pat. No. 6,511,935 and U.S. Pat. No. 6,248,831, the entire contents of both of which are herein incorporated by reference, may also be used. Such catalysts may further be modified with one precursor activator. Such further modifications are described in US patent publication No.: US2006/0287445 A1.

Preferably the catalyst precursor has the formula $Mg_dTi(OR)_eX_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is >2 and up to 1.5*d+3. It is prepared from a titanium compound, a magnesium compound, and an electron donor.

The electron donor is an organic Lewis base, liquid at temperatures in the range of 0° C. to 200° C., in which the magnesium and titanium compounds are soluble. The electron donor compounds are sometimes also referred to as Lewis bases. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate.

While a large excess of electron donor may be used initially to provide the reaction product of titanium compound and electron donor, the final catalyst precursor contains approximately 1 to approximately 20 moles of electron donor per mole of titanium compound and preferably approximately 1 to approximately 10 moles of electron donor per mole of titanium compound.

Since the catalyst will act as a template for the growth of the polymer, it is essential that the catalyst precursor be converted into a solid. It is also essential that the resultant solid has the appropriate particle size and shape to produce polymer particles with relatively narrow size distribution, low amounts of fines and good fluidization characteristics. Although this solution of Lewis Base, magnesium and titanium compounds may be impregnated into a porous support and dried to form a solid catalyst; it is preferred that the solution be converted into a solid catalyst via spray drying. Each of these methods thus forms a "supported catalyst precursor."

The spray dried catalyst product is then preferentially placed into a mineral oil slurry. The viscosity of the hydrocarbon slurry diluent is sufficiently low, so that the slurry can be conveniently pumped through the pre-activation apparatus, and eventually into the polymerization reactor. The catalyst is fed using a slurry catalyst feeder. A progressive cavity pump, such as a Moyno pump is typically used in commercial reaction systems, while a dual piston syringe pump is typically used in pilot scale reaction systems, where the catalyst flows are less than, or equal to, 10 $cm^3$/hour ($2.78\times10^{-9}$ $m^3$/s) of slurry.

A cocatalyst, or activator, is also fed to the reactor to effect the polymerization. Complete activation by additional cocatalyst is required to achieve full activity. The complete activation normally occurs in the polymerization reactor, although the techniques taught in EP 1,200,483 may also be used.

The cocatalysts, which are reducing agents, conventionally used, are comprised of aluminum compounds, but compounds of lithium, sodium and potassium, alkaline earth metals, as well as compounds of other earth metals than aluminum are possible. The compounds are usually hydrides, organometal or halide compounds. Butyl lithium and dibutyl magnesium are examples of useful compounds of other than aluminum.

An activator compound, which is generally used with any of the titanium based catalyst precursors, can have the formula $AlR_aX_bH_c$, wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides, wherein each alkyl radical has 1 to 6 carbon atoms, and the trialkylaluminums. Examples are diethylaluminum chloride and tri-n-hexylaluminum. 0.10 to 10 moles, and preferably 0.15 to 2.5 moles, of activator are used per mole of electron donor. The molar ratio of activator to titanium is in the range from 1:1 to 10:1, and is preferably in the range from 2:1 to 5:1.

The hydrocarbyl aluminum cocatalyst can be represented by the formula $R_3Al$ or $R_2AlX$, wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum hydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators and modifiers.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators as are cocatalysts. For variations, see for example, U.S. Pat. No. 5,106,926, incorporated herein by reference in its entirety. The cocatalyst is preferably added separately neat or as a solution in an inert solvent, such as isopentane, to the polymerization reactor at the same time as the flow of ethylene is initiated.

In those embodiments that use a support, the precursor is supported on an inorganic oxide support such as silica, aluminum phosphate, alumina, silica/alumina mixtures, silica that has been modified with an organoaluminum compound such as triethyl aluminum, and silica modified with diethyl zinc. In some embodiments silica is a preferred support. A typical support is a solid, particulate, porous material essentially inert to the polymerization. It is used as a dry powder having an average particle size of 10 to 250 μm and preferably 30 to 100 μm; a surface area of at least 200 $m^2$/g and preferably at least 250 $m^2$/g; and a pore size of at least $100\times10^{-10}$ m and preferably at least $200\times10^{-10}$ m. Generally, the amount of support used is that which will provide 0.1 to 1.0 millimole of titanium per gram of support and preferably 0.4 to 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

In another embodiment, metallocene catalysts, single-site catalysts and constrained geometry catalysts may be used in the practice of the invention. Generally, metallocene catalyst compounds include half and full sandwich compounds having one or more n-bonded ligands including cyclopentadienyl-type structures or other similar functioning structure such as pentadiene, cyclooctatetraendiyl and imides. Typical compounds are generally described as containing one or more ligands capable of n-bonding to a transition metal atom, usually, cyclopentadienyl derived ligands or moieties, in combination with a transition metal selected from Group 3 to 8, preferably 4, 5 or 6 or from the lanthanide and actinide series of the Periodic Table of Elements.

Exemplary of metallocene-type catalyst compounds are described in, for example, U.S. Pat. Nos. 4,530,914; 4,871,705; 4,937,299; 5,017,714; 5,055,438; 5,096,867; 5,120,867; 5,124,418; 5,198,401; 5,210,352; 5,229,478; 5,264,405; 5,278,264; 5,278,119; 5,304,614; 5,324,800; 5,347,025; 5,350,723; 5,384,299; 5,391,790; 5,391,789; 5,399,636; 5,408,017; 5,491,207; 5,455,366; 5,534,473; 5,539,124; 5,554,775; 5,621,126; 5,684,098; 5,693,730; 5,698,634; 5,710,297; 5,712,354; 5,714,427; 5,714,555; 5,728,641; 5,728,839; 5,753,577; 5,767,209; 5,770,753 and 5,770,664; European publications: EP-A-0 591 756; EP-A-0 520 732; EP-A-0 420 436; EP-A-0 485 822; EP-A-0 485 823; EP-A-0 743 324; EP-A-0 518 092; and PCT publications: WO 91/04257; WO 92/00333; WO 93/08221; WO 93/08199; WO 94/01471; WO 96/20233; WO 97/15582; WO 97/19959; WO 97/46567; WO 98/01455; WO 98/06759 and WO 98/011144. All of these references are incorporated herein, in their entirety, by reference.

Suitable catalysts for use herein, preferably include constrained geometry catalysts as disclosed in U.S. Pat. Nos. 5,272,236 and 5,278,272, which are both incorporated, in their entirety, by reference.

The monocyclopentadienyl transition metal olefin polymerization catalysts taught in U.S. Pat. No. 5,026,798, the teachings of which are incorporated herein by reference, are also suitable as catalysts of the invention.

The foregoing catalysts may further be described as comprising a metal coordination complex comprising a metal of groups 3-10 or the Lanthanide series of the Periodic Table of the Elements, and a delocalized π-bonded moiety, substituted with a constrain-inducing moiety. Such a complex has a constrained geometry about the metal atom. The catalyst further comprises an activating cocatalyst.

Any conventional ethylene homopolymerization or (co) polymerization reactions may be employed to produce the inventive high-density polyethylene composition. Such conventional ethylene homopolymerization or (co)polymerization reactions include, but are not limited to, gas phase polymerization, slurry phase polymerization, liquid phase polymerization, and combinations thereof using conventional reactors, for example, gas phase reactors, loop reactors, stirred tank reactors, and batch reactors in series, or in series and parallel. The polymerization system of the instant invention is a dual sequential polymerization system or a multi-sequential polymerization system. Examples of dual sequential polymerization system include, but are not limited to, gas phase polymerization/gas phase polymerization; gas phase polymerization/liquid phase polymerization; liquid phase polymerization/gas phase polymerization; liquid phase polymerization/liquid phase polymerization; slurry phase polymerization/slurry phase polymerization; liquid phase polymerization/slurry phase polymerization; slurry phase polymerization/liquid phase polymerization; slurry phase polymerization/gas phase polymerization; and gas phase polymerization/slurry phase polymerization. The multi-sequential polymerization systems includes at least three polymerization reactions. The catalyst system, described above, may also be a conventional catalyst system. The inventive high-density polyethylene composition is preferably produced via a dual gas phase polymerization process, for example, gas phase polymerization/gas phase polymerization; however, the instant invention is not so limited, and any of the above combinations may be employed.

In production, a dual sequential polymerization system connected in series, as described above, may be used. The first component, that is, the high molecular weight ethylene polymer, can be produced in the first stage of the dual sequential polymerization system, and the second component, that is, the low molecular weight ethylene polymer, can be prepared in the second stage of the dual sequential polymerization system. Alternatively, the second component, that is, the low molecular weight ethylene polymer, can be made in the first stage of the dual sequential polymerization system, and the first component, that is, the high molecular weight ethylene polymer, can be made in the second stage of the dual sequential polymerization system.

For purposes of the present disclosure, the reactor, in which the conditions are conducive to making the first component is known as the first reactor. Alternatively, the reactor in which the conditions are conducive to making the second component is known as the second reactor.

In production, a catalyst system including a cocatalyst, ethylene, one or more alpha-olefin comonomers, hydrogen, and optionally inert gases and/or liquids, for example, $N_2$, isopentane, and hexane, are continuously fed into a first reactor, which is connected to a second reactor in series; the first component/active catalyst mixture is then continuously transferred, for example, in batches from the first reactor to the second reactor. Ethylene, hydrogen, cocatalyst, and optionally inert gases and/or liquids, for example, $N_2$, isopentane, hexane, are continuously fed to the second reactor, and the final product, that is, the inventive high-density polyethylene composition, is continuously removed, for example, in batches from the second reactor. A preferred mode is to take batch quantities of first component from the first reactor, and transfer these to the second reactor using the differential pressure generated by a recycled gas compression system. The inventive high-density polyethylene composition is then transferred to a purge bin under inert atmosphere conditions. Subsequently, the residual hydrocarbons are removed, and moisture is introduced to reduce any residual aluminum alkyls and any residual catalysts before the inventive high-density polyethylene composition is exposed to oxygen. The inventive high-density polyethylene composition is then transferred to an extruder to be pelletized. Such pelletization techniques are generally known. The inventive high-density polyethylene composition may further be melt screened. Subsequent to the melting process in the extruder, the molten composition is passed through one or more active screens (positioned in series of more than one) with each active screen having a micron retention size of from 2 to 400 (2 to $4\times10^{-5}$ m), and preferably 2 to 300 (2 to $3\times10^{-5}$ m), and most preferably 2 to 70 (2 to $7\times10^{-6}$ m), at a mass flux of 5 to 100 $lb/hr/in^2$ (1.0 to 20 $kg/s/m^2$). Such further melt screening is disclosed in U.S. Pat. No. 6,485,662, which is incorporated herein by reference to the extent that it discloses melt screening.

In an alternative production, a multi-sequential polymerization system connected in series and parallel, as described above, may be used. In one embodiment of the instant invention, a catalyst system including a cocatalyst, ethylene, one or more alpha-olefin comonomers, hydrogen, and optionally inert gases and/or liquids, for example, $N_2$, isopentane, and hexane, are continuously fed into a first reactor, which is connected to a second reactor, wherein the second reactor is connected to a third reactor in series; the first component/active catalyst mixture is then continuously transferred, for example, in batches from the first reactor to the second reactor, and then to the third reactor. Ethylene, hydrogen, cocatalyst, and optionally inert gases and/or liquids, for example, $N_2$, isopentane, and hexane, are continuously fed to the second and third reactors, and the final product, that is, high-density polyethylene composition, is continuously removed, for example, in batches from the third reactor. A preferred mode is to take batch quantities of first component from the first reactor, and transfer these to the second reactor, and then take batches from the second reactor and transfer these to the third reactor in series using the differential pressure generated by a recycled gas compression system. Alternatively, the first reactor may feed to both a second reactor and a third reactor in parallel, and the product from first reactor may be transferred to either second or third reactor. The high-density polyethylene composition is then transferred to a purge bin under inert atmosphere conditions. Subsequently, the residual hydrocarbons are removed, and moisture may be introduced to reduce any residual aluminum alkyls and any residual catalysts before the polymer, that is, the inventive high-density polyethylene composition, is exposed to oxygen. The inventive high-density polyethylene composition is then transferred to an extruder to be pelletized. Such pelletization techniques are generally known. The inventive high-density polyethylene composition may further be melt screened. Subsequent to the melting process in the extruder, the molten composition is passed through one or more active screens (positioned in series of more than one) with each active screen having a micron retention size of from 2 to 400 (2 to $4\times10^{-5}$ m), and preferably 2 to 300 (2 to $3\times10^{-5}$ m), and most preferably 2 to 70 (2 to $7\times10^{-6}$ m), at a mass flux of 5 to 100 $lb/hr/in^2$ (1.0 to 20 $kg/s/m^2$). Such further melt screening is disclosed in U.S. Pat. No. 6,485,662, which is incorporated herein by reference to the extent that it discloses melt screening.

In another alternative production, the inventive high-density polyethylene composition may be produced from polymers made in two or more independent reactors (each using the same or different catalyst) with post reaction blending.

In application, the inventive high-density polyethylene composition may be used to manufacture shaped articles. Such articles may include, but are not limited to, closure devices such as bottle caps, wire cable jacketing, conduit pipes, or injection blow molded articles. Different methods may be employed to manufacture articles such as bottle caps, wire cable jacketing, conduit pipes, or injection blow molded articles, for example, injection blow molded bottles. Suitable conversion techniques include, but are not limited to, wire coating, pipe extrusion, blow molding, co-extrusion blow molding, injection molding, injection blow molding, injection stretch blow molding, compression molding, extrusion, pultrusion, and calendering. Such techniques are generally well known. Preferred conversion techniques include wire coating, pipe extrusion, injection blow molding, compression molding, and injection molding.

In compression molding process, a two-piece mold provides a cavity having the shape of a desired molded article. The mold is heated, and an appropriate amount of the inventive high-density polyethylene composition, preferably in a molten form, is loaded into the lower half of the mold. The two parts of the mold are brought together under pressure. The inventive high-density polyethylene composition, softened by heat, is thereby welded into a continuous mass having the shape of the cavity. The continuous mass is hardened via chilling, under pressure, in the mold, thereby forming a compression molded article, for example, bottle cap. The compression molded cap may include a skirt that axially extends from the periphery of a base, and may further include internal threads for securing the cap to a container.

In injection molding process, the inventive high-density polyethylene composition is fed into an extruder via a hopper. The extruder conveys, heats, melts, and pressurizes the inventive high-density polyethylene composition to a form a molten stream. The molten stream is forced out of the extruder through a nozzle into a relatively cool mold held closed under pressure thereby filling the mold. The melt cools and hardens until fully set-up. The mold then opens and the molded article, for example, bottle cap, is removed. The injection molded cap may include a skirt that axially extends from the periphery of a base, and may further include internal threads for securing the cap to a container.

In blow molding process, for example, injection blow molding, the inventive high-density polyethylene composition is melted, and then, it is formed into a tube or parison via injection molding. The ends of the tube or parison is sealed, except for an area in which the blowing air can enter. The sealed tube or parison is inflated inside of a mold thereby taking the shape of the mold. The molded article, for example, bottle, is cooled, and then ejected from the mold. If necessary, the molded article is then trimmed.

Closure devices such as bottle caps including the inventive high-density polyethylene composition exhibit improved shrinkage properties while maintaining satisfactory environmental stress crack resistance. Such bottle caps are adapted to withstand the pressure of carbonated drinks Such bottle caps further facilitate closure, and sealing of a bottle, that is, optimum torque provided by a machine to screw the cap on the bottle, or unsealing a bottle, that is, optimum torque provide by a person to unscrew the cap.

EXAMPLES

It is understood that the present invention is operable in the absence of any component, which has not been specifically disclosed. The following examples are provided in order to further illustrate the invention and are not to be construed as limiting.

Inventive Examples 1-4

Inventive Examples 1-4 were prepared according to the following procedures: a dual-sequential polymerization system, for example, a first gas phase reactor and a second gas phase reactor operating in series, was provided. Ethylene, one or more alpha-olefin comonomers, hydrogen, catalyst, for example, Ziegler-Natta catalyst, slurried in mineral oil, $N_2$, and isopentane were fed continuously into the first reactor. Subsequently, a cocatalyst, for example, triethylaluminum (TEAL), was fed continuously into the first reactor to activate the catalyst. The first polymerization reaction of the ethylene in the presence of 1-hexene was carried out in the first reactor under the conditions shown below in Table I thereby producing first component-catalyst complex. The first component-catalyst complex was continuously transferred to the second reactor. Additional, ethylene, hydrogen, cocatalyst, for example, TEAL, $N_2$, and isopentane were fed continuously into the second reactor. No additional catalyst was added to the second reactor. The second polymerization reaction of ethylene was carried out in the second reactor under the conditions shown below in Table I thereby producing the first component-catalyst-second component complex. The first component-catalyst-second component complex was continuously removed from the second reactor in batches into the product chamber, where it was purged to remove residual hydrocarbons, and then transferred to a fiberpak drum. The fiberpak drum was continuously purged with humidified nitrogen. The polymer, that is, the inventive high-density polyethylene composition, was further processed in a mixer/pelletizer. Additional additives, as shown in Table III, were added to the polymer, that is, the inventive high-density polyethylene composition. The polymer, that is, the inventive high-density polyethylene composition, was melted in the mixer, and additives were dispersed therein the polymer, that is, the inventive high-density polyethylene composition, matrix. The inventive high-density polyethylene composition was extruded through a die plate, pelletized, and cooled. The resin samples of the inventive examples 1-4 were tested for their properties from pellets, or were formed into testing plaques according to ASTM D-4703-00 and then were tested for their properties. Such properties are shown in Tables I and II. Shrinkage properties were tested and are shown in Table VI.

Comparative Examples A-E

Comparative example A is a polyethylene copolymer (density of 0.953 g/cc, and melt index $I_2$ of 1.9 g/10 minutes)

commercially available under the tradename B4020N1331 polyethylene copolymer from INEOS Olefins and Polymers. Comparative example B is a polyethylene copolymer (density of 0.954 g/cc, and melt index $I_2$ of 1.5 g/10 minutes). Comparative example C is a polyethylene copolymer (density of 0.955 g/cc, and melt index $I_2$ of 1.5 g/10 minutes). Comparative example D is polyethylene copolymer (density of 0.955 g/cc, and melt index $I_2$ of 1.6 g/10 minutes) commercially available under the tradename Borstar® MB6561 from Borealis AIS, Denmark Comparative example E is a polyethylene copolymer (density of 0.956 g/cc, and melt index $I_2$ of 1.35 g/10 minutes). The resin samples of the comparative examples A-E were tested for their properties from pellets, or were formed into testing plaques according to ASTM D-4703-00 and then tested for their properties. The resin samples of the comparative examples A-E and the plaques made therefrom were tested for their properties. Such properties are shown in Tables IV. Comparative examples A-E were tested for their shrinkage properties and reported in Table V.

TEST METHODS

Unless otherwise noted, the values reported herein were determined according to the following test methods.

Density (g/cm$^3$) was measured according to ASTM-D 792-03, Method B, in isopropanol. Specimens were measured within 1 hour of molding after conditioning in the isopropanol bath at 23° C. for 8 min to achieve thermal equilibrium prior to measurement.

Melt index ($I_2$) was measured at 190° C. under a load of 2.16 kg according to ASTM D-1238-03.

Melt index ($I_{21}$) was measured at 190° C. under a load of 21 kg according to ASTM D-1238-03.

Vinyl unsaturation was measured according to ASTM D-6248-98.

Compression molded plaque preparation: A number of tests require a compression molded plaque to be made from which specimen(s) are die cut or machined or the like. The plaques were compression molded according to ASTM D-4703-00 Annex A1 with a 5 min initial heating period at about 190° C. and a 15° C./min cooling rate per Procedure C. The plaques were cooled from 190 C to 45° C. in the press at the 15 degrees C. per min cooling rate. The plaques were then further cooled until "cool to the touch".

Resin stiffness was characterized by measuring the Flexural Modulus at 5 percent strain and Secant Modulii at 1 percent and 2 percent strain, and a test speed of 0.5 inch/min (13 mm/min) according to ASTM D 790-99 Method B.

Tensile strength at yield and elongation at break were measured according to ASTM D-638-03 employing Type IV Specimen at 2 inch/minute (50 mm/minute).

The environmental stress crack resistance (ESCR) ($F_{50}$) was measured according to ASTM-D 1693-01, Condition B. The susceptibility of the resin to mechanical failure by cracking was measured under constant strain conditions, and in the presence of a crack accelerating agent such as soaps, wetting agents, etc. Measurements were carried out on notched specimens, in a 10 percent, by volume, Igepal CO-630 (vendor Rhone-Poulec, N.J.) aqueous solution, maintained at 50° C. The ESCR value was reported as $F_{50}$, the calculated 50 percent failure time from the probability graph Comonomer content was measured using $C_{13}$ NMR, as discussed in Randall, *Rev. Macromol. Chem. Chys.*, C29 (2&3), pp. 285-297, and in U.S. Pat. No. 5,292,845, the disclosures of which are incorporated herein by reference to the extent related to such measurement. The samples were prepared by adding approximately 3 g of a 50/50 mixture of tetrachloroethane-d2/orthodichlorobenzene that was 0.025M in chromium acetylacetonate (relaxation agent) to 0.4 g sample in a 10 mm NMR tube. The samples were dissolved and homogenized by heating the tube and its contents to 150° C. The data was collected using a JEOL Eclipse 400 MHz NMR spectrometer, corresponding to a 13C resonance frequency of 100.6 MHz. Acquisition parameters were selected to ensure quantitative 13C data acquisition in the presence of the relaxation agent. The data was acquired using gated 1H decoupling, 4000 transients per data file, a 4.7 sec relaxation delay and 1.3 second acquisition time, a spectral width of 24,200 Hz and a file size of 64K data points, with the probe head heated to 130° C. The spectra were referenced to the methylene peak at 30 ppm. The results were calculated according to ASTM method D5017-91.

Gel Permeation Chromotography

Polymer molecular weight was characterized by high temperature gel permeation chromatography. The chromatographic system consisted of a Waters (Milford, Mass.) 150° C. high temperature chromatograph, equipped with an infrared detector (IR4) from PolymerChar (Valencia, Spain).

Data collection was performed using Viscotek TriSEC software version 3 and a 4-channel Viscotek Data Manager DM400. The Carrier solvent was 1,2,4-trichlorobenzene (TCB). The system was equipped with an on-line solvent degas device from Polymer Laboratories. The carousel compartment and the column compartment was operated at 150° C. The columns were four Polymer Laboratories Mixed-A 30 cm, 20 micron columns. The polymer solutions of reference and inventive samples were prepared in TCB. The sample solutions were prepared at a concentration of 0.1 gram of polymer in 50 ml of solvent. The chromatographic solvent (TCB) and the sample preparation solvent (TCB) contained 200 ppm of butylated hydroxytoluene (BHT). Both solvent sources were nitrogen sparged. Polyethylene samples were stirred gently at 160° C. for 4 hours. The injection volume was 200 µl, and the flow rate was 1.0 ml/minute.

The preferred column set is of 20 micron particle size and "mixed" porosity gel to adequately separate the highest molecular weight fractions appropriate to the claims.

Calibration of the GPC column set was performed with 21 narrow molecular weight distribution polystyrene standards. The molecular weights of the standards ranged from 580 to 8,400,000 g/mol, and were arranged in 6 "cocktail" mixtures, with at least a decade of separation between individual molecular weights.

The polystyrene standard peak molecular weights were converted to polyethylene molecular weights using the following equation (as described in Williams and Ward, J. Polym. Sci., Polym. Let., 6, 621 (1968)):

$$M\text{polyethylene}=A\times(M\text{polystyrene})^B \quad (1),$$

where M is the molecular weight, A has a cited value of 0.4316, and B is equal to 1.0. An alternative value of A, herein referred to as "q" or as a "q factor", was experimentally determined to be around 0.39. The best estimate of "q" was determined using the predetermined weight average molecular weight of a broad linear polyethylene homopolymer (Mw~115,000 g/mol, Mw/Mn~3.0). Said weight average molecular weight was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Page 113-136, Oxford, N.Y. (1987)). The response factor, $K_{Ls}$, of the laser detector was determined using the certificated value for the weight average molecular weight of NIST 1475 (52,000 g/mol). The method for obtaining the alternative "q factor" is described in more detail below.

A first order polynomial was used to fit the respective polyethylene-equivalent calibration points obtained from equation 1 to their observed elution volumes. The actual polynomial fit was obtained so as to relate the logarithm of polyethylene equivalent molecular weights to the observed elution volumes (and associated powers) for each polystyrene standard.

The total plate count of the GPC column set was performed with Eicosane (prepared at 0.04 g in 50 milliliters of TCB, and dissolved for 20 minutes with gentle agitation.) The plate count and symmetry were measured on a 200 microliter injection according to the following equations:

$$\text{PlateCount}=5.54*(RV \text{ at Peak Maximum}/(\text{Peak width at } \tfrac{1}{2} \text{ height}))^2 \quad (2),$$

where RV is the retention volume in milliliters, and the peak width is in milliliters.

$$\text{Symmetry}=(\text{Rear peak width at one tenth height}-RV \text{ at Peak maximum})/(RV \text{ at Peak Maximum}-\text{Front peak width at one tenth height}) \quad (3),$$

where RV is the retention volume in milliliters, and the peak width is in milliliters.

The plate count for the chromatographic system (based on eicosane as discussed previously) should be greater than 22,000, and symmetry should be between 1.00 and 1.12.

The calculations of Mn, Mw, and Mz based on GPC results using the IR4 detector and the narrow standards calibration were determined from the following equations:

$$\overline{Mn} = \frac{\sum^{i} IR_i}{\sum^{i}\left(\frac{IR_i}{M_{PE,i}}\right)}, \quad (4)$$

$$\overline{Mw} = \frac{\sum^{i} (IR_i * M_{PE,i})}{\sum^{i} IR_i}, \quad (5)$$

$$\overline{Mz} = \frac{\sum^{i} (IR_i * M_{PE,i}^2)}{\sum^{i} (IR_i * M_{PE,i})} \quad (6)$$

Where $IR_i$ and $M_{PE,i}$ are the IR baseline corrected response and conventional calibrated polyethylene molecular weight for the $i^{th}$ slice of the IR response, elution volume paired data set. The equations 4, 5, and 6 are calculated from polymers prepared in solutions of TCB.

The "q-factor" described previously was obtained by adjusting "q" or A is equation 1 until Mw, the weight average molecular weight calculated using equation 5 and the corresponding retention volume polynomial, agreed with the independently determined value of Mw obtained in accordance with Zimm for the broad linear polyethylene homopolymer (115,000 g/mol).

In order to monitor the deviations over time, which may contain an elution component (caused by chromatographic changes) and a flow rate component (caused by pump changes), a late eluting narrow peak is generally used as a "flow rate marker peak". A flow rate marker was therefore established based on a decane flow marker dissolved in the eluting sample prepared in TCB. This flow rate marker was used to linearly correct the flow rate for all samples by alignment of the decane peaks.

Rheological Characterization

Shear viscosity was obtained from dynamic mechanical oscillatory shear measurements, which were performed with a TA Instruments ARES rheometer at 190° C. using 25 mm parallel plates at a strain of 10 percent under an inert nitrogen atmosphere. The angular frequency interval was from 0.1 to 100 radians/second. The storage modulus, loss modulus, tan delta, and complex viscosity of the resin were obtained from the measurement. The viscosity ratio (0.1 rad/s to 100 rad/s) was determined by the ratio of the complex viscosity measured at angular frequency of 0.1 rad/s to the complex viscosity measured at angular frequency of 100 rad/s.

Shrinkage Properties

Shrinkage properties were measured according to ISO 294-4. A plaque with the dimensions 60 mm×60 mm×2 mm was prepared via injection molding using a 110 ton Toyo injection molding machine with a 32 mm screw, according to the conditions listed in Table VII Immediately after molding, the right side plaque from the ISO 294-4 bowtie plaque was removed from the runner and measured at the center in each direction. The plaques are then stored at room temperature (23±2° C.), and dimensions were measured again after 24 and 48 hrs. Shrinkage is defined as the percentage change in dimension at measurement time from the original mold dimensions:

48 hr shrinkage percent=(original dimension−48 hr dimension)/original dimension*100

24 hr shrinkage percent=(original dimension−24 hr dimension)/original dimension*100

0 hr shrinkage percent=(original dimension−0 hr dimension)/original dimension*100

A positive shrinkage value indicates that the part dimension is less than the mold dimension.

MD shrinkage is the shrinkage measured on the shrinkage plaque in the flow direction, and TD shrinkage is the shrinkage measured in the crossflow direction. Machine Direction (MD)/Transverse Direction (TD) is the percentage in the flow direction divided by the percentage in the cross-flow direction.

The present invention may be embodied in other forms without departing from the spirit and the essential attributes thereof, and, accordingly, reference should be made to the appended claims, rather than to the foregoing specification, as indicating the scope of the invention.

TABLE I

| | Example No. | | | |
|---|---|---|---|---|
| | Example 1 | Example 2 | Example 3 | Example 4 |
| Co-Monomer Type | 1-hexene | 1-hexene | 1-hexene | 1-hexene |
| Catalyst | Ziegler-Natta | Ziegler-Natta | Ziegler-Natta | Ziegler-Natta |
| Co-Catalyst | 2.5% TEAL | 2.5% TEAL | 2.5% TEAL | 2.5% TEAL |
| $1^{st}$ Reactor Type | Gas Phase | Gas Phase | Gas Phase | Gas Phase |
| $2^{nd}$ Reactor Type | Gas Phase | Gas Phase | Gas Phase | Gas Phase |

TABLE I-continued

| | Example No. | | | |
|---|---|---|---|---|
| | Example 1 | Example 2 | Example 3 | Example 4 |
| $1^{st}$ Reactor Temperature (° C.) | 85 | 85 | 85 | 85 |
| $2^{nd}$ Reactor Temperature (° C.) | 95 | 95 | 95 | 95 |
| $1^{st}$ Reactor Pressure (psi) | 348 | 347 | 347 | 347 |
| $2^{nd}$ Reactor Pressure (psi) | 381 | 398 | 395 | 398 |
| $1^{st}$ Reactor $C_2$ Partial Pressure (psi) | 36 | 34 | 27 | 31 |
| $2^{nd}$ Reactor $C_2$ Partial Pressure (psi) | 122 | 124 | 95 | 101 |
| $1^{st}$ Reactor $H_2/C_2$ Molar Ratio | 0.147 | 0.176 | 0.150 | 0.140 |
| $2^{nd}$ Reactor $H_2/C_2$ Molar Ratio | 1.41 | 0.80 | 1.40 | 1.40 |
| $1^{st}$ Reactor $C_6/C_2$ Molar Ratio | 0.055 | 0.049 | 0.038 | 0.052 |
| $2^{nd}$ Reactor $C_6/C_2$ Molar Ratio | 0.002 | 0.002 | 0.010 | 0.002 |
| Catalyst Feed Rate (cc/hr) (First Reactor Only) | 3.2 | 5.2 | 5.7 | 5.4 |
| $1^{st}$ Reactor Isopentane (Mole %) | 10 | 9.8 | 9.8 | 9.8 |
| $2^{nd}$ Reactor Isopentane (Mole %) | 0.27 | 0.26 | 0.36 | 0.31 |

TABLE II

| | Example No. | | | |
|---|---|---|---|---|
| | Example 1 | Example 2 | Example 3 | Example 4 |
| Split ($1^{st}$ reactor/$2^{nd}$ reactor) | 45.9/54.1 | 43.0/57.0 | 45.6/54.4 | 49.6/50.4 |
| Cocatalyst Feed Rate (cc/hr) ($1^{st}$ reactor/$2^{nd}$ reactor) | 155/132 | 160/160 | 209/195 | 186/204 |
| Production Rate (lb/hr) ($1^{st}$ reactor/$2^{nd}$ reactor) | 29.0/50.5 | 26.9/61.6 | 27.6/55.0 | 28.0/49.6 |
| Bed Weight (lbs) ($1^{st}$ reactor/$2^{nd}$ reactor) | 79.2/132.8 | 79.2/135.9 | 79.2/136.2 | 79.5/135.4 |
| FBD ($lb/ft^3$) ($1^{st}$ reactor/$2^{nd}$ reactor) | 7.0/15.6 | 6.8/14.6 | 7.6/15.6 | 6.8/14.9 |
| Bed Volume ($ft^3$) ($1^{st}$ reactor/$2^{nd}$ reactor) | 12.2/12.3 | 12.6/12.5 | 11.2/12.1 | 12.4/12.5 |
| Residence Time (hr) ($1^{st}$ reactor/$2^{nd}$ reactor) | 12.2/3.2 | 12.6/3.2 | 11.2/3.2 | 12.4/3.2 |
| STY ($lb/hr/ft^3$) ($1^{st}$ reactor/$2^{nd}$ reactor) | 2.4/4.1 | 2.1/4.9 | 2.5/4.5 | 2.3/4.0 |
| Melt flow rate ($I_{21}$) ($1^{st}$ Component) (~) (g/10 minutes) | 5.78 | 8.58 | 5.47 | 5.68 |
| Density ($1^{st}$ Component) (~) ($g/cm^3$) | 0.9319 | 0.9342 | 0.9348 | 0.9319 |
| Residual Ti (ppm) ($1^{st}$ component/$2^{nd}$ component) | 2.74/1.26 | 2.98/1.28 | 4.15/1.89 | 3.27/1.62 |
| Residual Al (ppm) ($1^{st}$ component/$2^{nd}$ component) | 63.4/33.3 | 65.0/32.7 | 99.9/55.6 | 72.9/50.9 |
| Al/Ti Molar Residual Ti (ppm) ($1^{st}$ component/$2^{nd}$ component) | 42/47 | 39/46 | 43/52 | 40/56 |
| Bulk Density ($lb/ft^3$) Residual Ti (ppm) ($1^{st}$ component/$2^{nd}$ component) | 17.8/22.8 | 17.9/22.1 | 18.4/23.0 | 17.7/22.4 |
| H-D Polyethylene Composition Melt Index ($I_2$) (2.16 g/10 minutes) | 2.59 | 2.86 | 2.70 | 2.24 |
| H-D Polyethylene Composition Melt flow rate ($I_{21}$) (21 g/10 minutes) | 120.9 | 89.6 | 108.7 | 97.3 |
| H-D Polyethylene Composition Melt Flow Ratio ($MI_{21}/MI_2$) | 47 | 31 | 40 | 43 |
| H-D Polyethylene Composition Density ($g/cm^3$) ASTM Slow cooled | 0.9545 | 0.9550 | 0.9536 | 0.9537 |
| C13 NMR Hexene Content (Weight Percent) | 1.2 | — | — | 1.3 |
| H-D Polyethylene Composition ($M_n$) | 12,700 | 14,300 | 11,600 | 11,000 |
| H-D Polyethylene Composition ($M_w$) | 121,000 | 118,000 | 112,000 | 122,000 |
| H-D Polyethylene Composition ($M_w/M_n$) | 7.53 | 6.11 | 7.72 | 8.50 |
| Viscosity at 10−2 sec-1 Shear Rate (Pa · s) | 4,700 | 4,000 | 5,200 | 5,900 |
| Viscosity at 10+2 sec-1 Shear Rate (Pa · s) | 747 | 884 | 778 | 8.56 |
| Ratio 10−2/10+2 | 6.3 | 4.6 | 6.7 | 6.9 |
| Tan Delta @ 10−2 | 18.5 | 36.1 | 15.7 | 16.1 |
| Tan Delta @ 10+2 | 1.1 | 1.3 | 1.1 | 1.1 |
| Flexural Modulus (0.5 in/min) (psi) | 237,000 | 211,000 | 193,000 | 215,000 |
| Standard Deviation (+/−) | 9,500 | 14,000 | 8,200 | 9,000 |
| 2% Secant Modulus (psi) | 157,000 | 155,000 | 145,000 | 153,000 |
| Standard Deviation (+/−) | 2,400 | 6,500 | 2,600 | 5,400 |
| 1% Secant Modulus (psi) | 199,000 | 187,000 | 173,000 | 188,000 |
| Standard Deviation (+/−) | 3,500 | 11,000 | 4,700 | 6,800 |
| Tensile Properties | | | | |
| Tensile Strength (psi) | 154,000 | 203,000 | 158,000 | 172,000 |
| Standard Deviation (+/−) | 33,000 | 63,000 | 24,000 | 65,000 |
| Elongation at Break (%) | 1,200 | 610 | 730 | 770 |
| Standard Deviation (+/−) | 227 | 211 | 222 | 38.6 |
| Yield Strength (psi) | 3,990 | 4,160 | 4,040 | 3,960 |
| Standard Deviation (+/−) | 65 | 72 | 112 | 116 |
| Elongation at Yield (%) | 9.58 | 7.62 | 9.06 | 9.12 |
| Standard Deviation (+/−) | 0.88 | 0.66 | 0.73 | 1.1 |
| ESCR Test Data | | | | |
| 50° C.; 10% Igepal; 75 mil plaque, 12 mil slit (F50 hours) | 189 | 68 | 287 | 737 |

TABLE III

| | Example No. | | | |
|---|---|---|---|---|
| | Example 1 | Example 2 | Example 3 | Example 4 |
| Calcium Stearate (ppm) | 600 | 600 | 600 | 600 |
| Irganox 1010 (ppm) | 500 | 500 | 500 | 500 |
| Irgafos 168 Total (ppm) | 500 | 500 | 500 | 500 |

TABLE IV

| | Comparative Example No. | | | | |
|---|---|---|---|---|---|
| | Comparative A | Comparative B | Comparative C | Comparative D | Comparative E |
| Melt Index ($I_2$) (2.16 g/10 minutes) | 2.22 | 1.49 | 1.49 | 1.6 | 1.35 |
| Melt Index ($I_{21}$) (21 g/10 minutes) | 67.9 | 86.5 | 98.3 | | |
| Melt Flow Ratio ($MI_{21}/MI_2$) | 31 | 58 | 66 | | 65 |
| Density (g/cm$^3$) | 0.9535 | 0.9536 | 0.9549 | 0.9547 | 0.9564 |
| C13 NMR Hexene Content (Weight Percent) | — | — | 1.1 | — | — |
| C13 NMR Butene Content (Weight Percent) | — | — | — | — | 0.9 |
| $M_n$ | 16,700 | 10,600 | 12,100 | 7,900 | 7,800 |
| $M_w$ | 111,000 | 105,000 | 130,000 | 111,000 | 120,000 |
| $M_w/M_n$ | 6.66 | 9.95 | 10.75 | 14.09 | 15.3 |
| Viscosity at 10−2 sec-1 Shear Rate (Pa · s) | 4,900 | 9,600 | 18,400 | 9,700 | 12,500 |
| Viscosity at 10+2 sec-1 Shear Rate (Pa · s) | 1,080 | 1,070 | 910 | 940 | 910 |
| Ratio 10−2/10+2 | 4.52 | 9.03 | 20.3 | 10.3 | 13.8 |
| Tan Delta @ 10−2 | 17.5 | 10.8 | 2.8 | 12.8 | 5.9 |
| Tan Delta @ 10+2 | 1.4 | 1.0 | 0.84 | 0.94 | 0.91 |
| Flexural Modulus (0.5 in/min) (psi) | 203,000 | 236,000 | 243,000 | — | 227,000 |
| 2% Secant Modulus (psi) | 132,000 | 147,000 | 163,000 | — | 160,000 |
| Tensile Properties | | | | | |
| Elongation at Break (%) | 990 | 799 | 858 | 490 | 557 |
| Yield Strength (psi) | 3,870 | 3,830 | 3,410 | 3,410 | 4,060 |
| Elongation at Yield (%) | — | 13.3 | 6.3 | 4.21 | 7.74 |
| ESCR Test Data | | | | | |
| 50 C 10% Igepal 75 mil plaque, 12 mil slit (F50 hours) | 35 | 335 | 310 | 394 | >400 |

TABLE V

| Shrinkage | | Comparative 1 | Comparative 2 | Comparative 3 | Comparative 4 | Comparative 5 |
|---|---|---|---|---|---|---|
| 0 hr - MD | Natural | 2.28 | 2.43 | 2.90 | 3.02 | 3.28 |
| 0 hr - TD | | 0.97 | 0.90 | 0.64 | 0.69 | 0.5 |
| 48 hr - MD | | 2.80 | 3.15 | 3.63 | 3.71 | 3.83 |
| 48 hr - TD | | 1.16 | 0.95 | 0.92 | 0.98 | 0.85 |
| 48 hr MD/TD | | 2.41 | 3.32 | 3.95 | 3.79 | 4.51 |
| 0 hr - MD | White | 2.96 | 2.98 | 3.25 | 3.29 | 3.3 |
| 0 hr - TD | | 0.73 | 0.64 | 0.53 | 0.59 | 0.44 |
| 48 hr - MD | | 3.28 | 3.48 | 3.89 | 3.88 | 3.82 |
| 48 hr - TD | | 1.06 | 0.78 | 0.67 | 0.77 | 0.62 |
| 48 hr MD/TD | | 3.11 | 4.49 | 5.81 | 5.04 | 6.16 |
| 0 hr - MD | Blue | 2.93 | 3.32 | 3.12 | 3.17 | 3.33 |
| 0 hr - TD | | 0.71 | 0.58 | 0.56 | 0.54 | 0.47 |
| 48 hr - MD | | 3.36 | 3.66 | 3.67 | 3.87 | 3.8 |
| 48 hr - TD | | 0.91 | 0.75 | 0.64 | 0.79 | 0.67 |
| 48 hr MD/TD | | 3.71 | 4.88 | 5.73 | 4.91 | 5.67 |
| 0 hr - MD | Orange | 3.17 | 3.39 | 3.34 | 3.44 | 3.49 |
| 0 hr - TD | | 0.43 | 0.45 | 0.45 | 0.47 | 0.42 |
| 48 hr - MD | | 3.57 | 3.76 | 4.12 | 3.94 | 4.06 |
| 48 hr - TD | | 0.64 | 0.56 | 0.81 | 0.60 | 0.69 |
| 48 hr MD/TD | | 5.57 | 6.72 | 5.09 | 6.57 | 5.88 |

TABLE VI

| Shrinkage | | Inventive 1 | Inventive 2 | Inventive 3 | Inventive 4 |
|---|---|---|---|---|---|
| 0 hr - MD | Natural | 2.61 | 2.56 | 2.65 | 2.77 |
| 0 hr - TD | | 0.97 | 1.03 | 0.97 | 0.75 |
| 48 hr - MD | | 3.24 | 3.04 | 3.13 | 3.32 |
| 48 hr - TD | | 1.34 | 1.37 | 1.25 | 1.14 |
| 48 hr MD/TD | | 2.42 | 2.22 | 2.50 | 2.91 |
| 0 hr - MD | White | 2.80 | 2.79 | 2.83 | 2.99 |

TABLE VI-continued

| Shrinkage | | Inventive 1 | Inventive 2 | Inventive 3 | Inventive 4 |
|---|---|---|---|---|---|
| 0 hr - TD | | 0.58 | 0.75 | 0.77 | 0.64 |
| 48 hr - MD | | 3.38 | 3.18 | 3.18 | 3.41 |
| 48 hr - TD | | 0.93 | 1.17 | 1.08 | 0.87 |
| 48 hr MD/TD | | 3.63 | 2.72 | 2.94 | 3.92 |
| 0 hr - MD | Blue | 2.91 | 2.82 | 2.85 | 2.96 |

TABLE VI-continued

| Shrinkage | | Inventive 1 | Inventive 2 | Inventive 3 | Inventive 4 |
|---|---|---|---|---|---|
| 0 hr - TD | | 0.65 | 0.84 | 0.80 | 0.67 |
| 48 hr - MD | | 3.41 | 3.23 | 3.27 | 3.47 |
| 48 hr - TD | | 0.97 | 1.16 | 1.16 | 0.97 |
| 48 hr MD/TD | | 3.52 | 2.79 | 2.82 | 3.58 |
| 0 hr - MD | Orange | 3.21 | 2.98 | 3.04 | 3.07 |
| 0 hr - TD | | 0.44 | 0.54 | 0.61 | 0.55 |

TABLE VI-continued

| Shrinkage | Inventive 1 | Inventive 2 | Inventive 3 | Inventive 4 |
|---|---|---|---|---|
| 48 hr - MD | 4.38 | 3.50 | 3.45 | 3.62 |
| 48 hr - TD | 0.69 | 0.70 | 0.84 | 0.72 |
| 48 hr MD/TD | 6.35 | 5.00 | 4.11 | 5.03 |

TABLE VII

| Melt Temperatures (° C.) | |
|---|---|
| Rear | 240 |
| Center Rear | 240 |
| Center Front | 240 |
| Nozzle | 240 |
| Mold Temperatures (° F.) | |
| Side A | 70 |
| Side B | 70 |
| Injection Pressure (psi) | 1,500 |
| Injection Velocity (cc/s) | 8 |
| Transfer Volume (cc) | 7 |
| Cushion (cc) | 2.2 |
| Full Time (sec) | 3.39 |
| Hold Pressure (psi) | 500 |
| Hold Time (sec) | 10 |
| RPM | 50 |
| Back Pressure (psi) | 100 |
| Shot Size (cc) | 32.5 |
| Suck Back (cc) | 1.5 |
| Recovery Time (sec) | 13 |

We claim:

1. A high-density polyethylene composition comprising:

a first component comprising a high molecular weight ethylene alpha-olefin copolymer having a density in the range of 0.930 to 0.935 g/cm$^3$, and a melt flow rate ($I_{21}$) in the range of 4 to 9 g/10 minutes; and a second component comprising a low molecular weight ethylene polymer having a density in the range of 0.960 to 0.973 g/cm$^3$;

wherein said high-density polyethylene composition has a melt index ($I_2$) in the range of from 2 to 5 g/10 minutes, a density in the range of from 0.950 to 0.960 g/cm$^3$, and a flow direction shrinkage to cross flow direction shrinkage ratio after 48 hours in the range of from 2 to 3.0, and an environmental stress crack resistance (ESCR) (F50) according to ASTM D-1693, condition B at 50° C., and using 10 percent Branched Octylphenoxy Poly(Ethyleneoxy) Ethanol, in the range of equal to or greater than 50 hours.

2. A closure device comprising:

a high-density polyethylene composition comprising:

a first component comprising a high molecular weight ethylene alpha-olefin copolymer having a density in the range of 0.930 to 0.935 g/cm$^3$, and a melt flow rate ($I_{21}$) in the range of 4 to 9 g/10 minutes; and a second component comprising a low molecular weight ethylene polymer having a density in the range of 0.960 to 0.973 g/cm$^3$;

wherein said high-density polyethylene composition has a melt index ($I_2$) in the range of from 2 to 5 g/10 minutes, a density in the range of from 0.950 to 0.960 g/cm$^3$, and a flow direction shrinkage to cross flow direction shrinkage ratio after 48 hours in the range of from 2 to 3.0, and an environmental stress crack resistance (ESCR) (F50) according to ASTM D-1693, condition B at 50° C., and using 10 percent Branched Octylphenoxy Poly(Ethyleneoxy) Ethanol, in the range of equal to or greater than 50 hours.

3. The high-density polyethylene composition according to claim 1, wherein said high-density polyethylene composition has a melt flow ratio ($I_{21}/I_2$) of less than 60.

4. The high-density polyethylene composition according to claim 1, wherein said first component has a molecular weight, Mw, in the range of from 140,000 to 200,000.

5. The high-density polyethylene composition according to claim 1, wherein said second component has a molecular weight, Mw, in the range of from 10,000 to 30,000.

6. The high-density polyethylene composition according to claim 1, wherein the high-density polyethylene composition has a high load melt index ($I_{21}$) from 89.6 to 120.9, a melt flow ratio ($I_{21}/I_2$) from 31 to 47.

7. The closure device according to claim 2, wherein the high-density polyethylene composition has a high load melt index ($I_{21}$) from 89.6 to 120.9, a melt flow ratio ($I_{21}/I_2$) from 31 to 47.

* * * * *